United States Patent [19]

Kim

[11] Patent Number: 5,319,677
[45] Date of Patent: Jun. 7, 1994

[54] DIVERSITY COMBINER WITH MLSE FOR DIGITAL CELLULAR RADIO

[75] Inventor: Youngky Kim, N. Potomac, Md.

[73] Assignee: Hughes Aircraft Company, Los Angeles, Calif.

[21] Appl. No.: 881,973

[22] Filed: May 12, 1992

[51] Int. Cl.$^5$ .................. H04B 7/10; H04L 1/02; H04L 27/06; H03D 1/00
[52] U.S. Cl. .................. 375/100; 375/94; 375/102
[58] Field of Search .................. 375/14, 38, 40, 99, 375/100, 101, 102, 13, 94; 371/43, 44, 45; 455/132, 133, 137

[56] References Cited

U.S. PATENT DOCUMENTS

| | | | |
|---|---|---|---|
| 5,065,411 | 11/1991 | Muto | 375/100 |
| 5,127,025 | 6/1992 | Okanoue | 375/100 |
| 5,191,598 | 3/1993 | Bäckström et al. | 375/40 |

OTHER PUBLICATIONS

D'Avella et al., "Evaluation of Diversity Schemes in TDMA Digital Mobile Radio", Global Communications, 1990, pp. 490–494.

*Primary Examiner*—Stephen Chin
*Assistant Examiner*—Kobayashi, Duane
*Attorney, Agent, or Firm*—Gordon R. Lindeen, III; William J. Streeter; Wanda K. Denson-Low

[57] ABSTRACT

A diversity combiner for use with the maximum likelihood sequence estimator is disclosed. First and second receive channels produce demodulated replicas $Z_1(k)$ and $Z_2(k)$ of the transmitted symbol data $I(k)$. The two signals are processed in a Viterbi equalizer to obtain a single branch metric calculation based on the two signals $Z_1(k)$ and $Z_2(k)$. The Viterbi equalizer provides an estimated value of $I(k)$ based on this single branch metric calculation, which is used for channel estimator for both antennas.

9 Claims, 1 Drawing Sheet

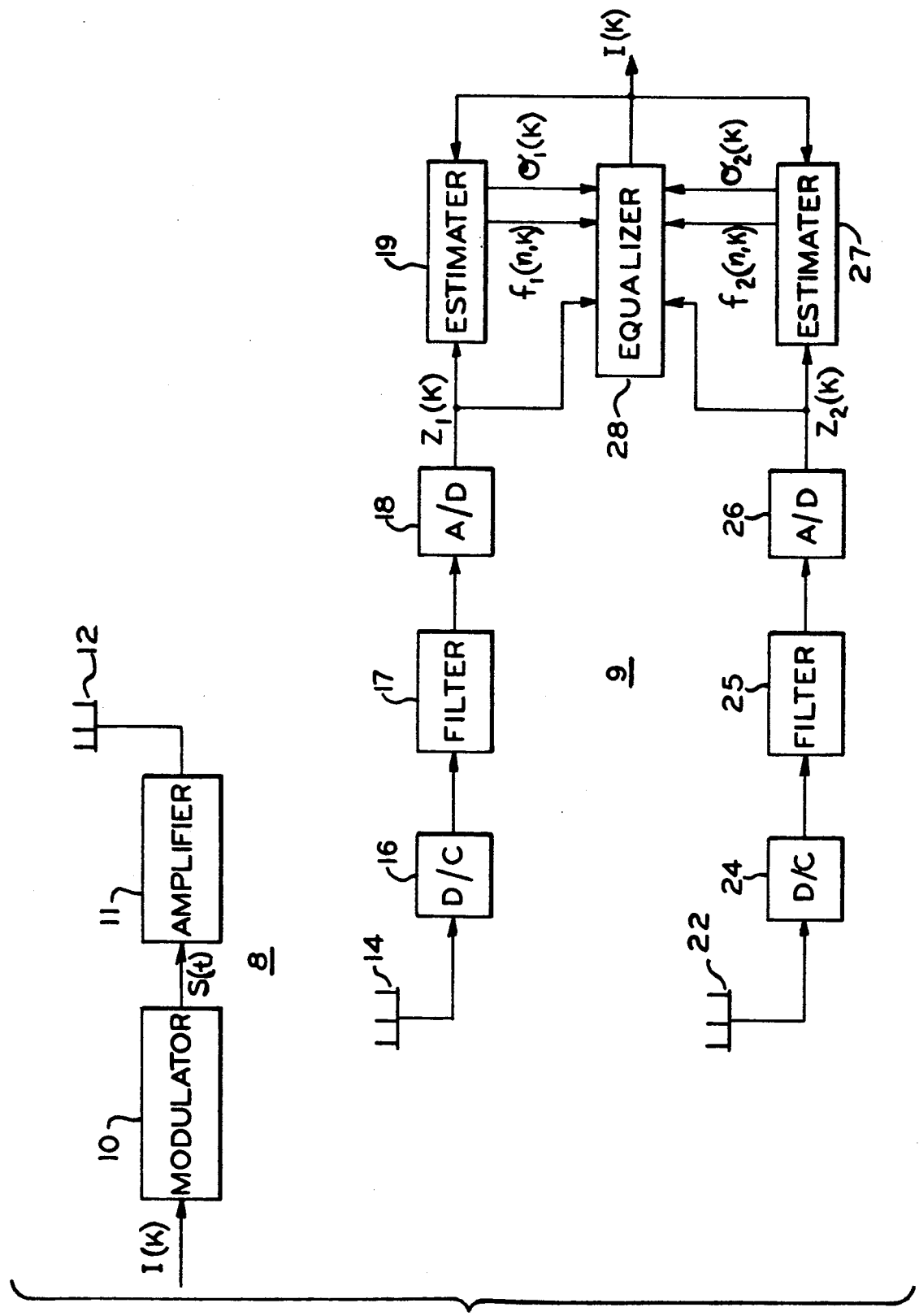

DIVERSITY COMBINER WITH MLSE FOR DIGITAL CELLULAR RADIO

The present application relates to digital cellular communications systems. Specifically, a technique is shown for utilizing diversity comunication systems with a maximum likelihood sequence estimator.

Digital communication systems are employed to increase the system capacity to carry radio telephone traffic. Diversity systems enhance the performance of such digital communications systems. Diversity is particularly useful in a base station for a cellular system, wherein two antennas and two receive RF channels receive the data signal being transmitted over the cellular channel. The two channels with separate receiving antennas can be combined in a way to provide improved estimation of the recovered data in the face of Rayleigh phenomena. The diversity techniques using the two channels provide a performance improvement of upwards to 7 dB over a single channel attempting to recover data transmitted in the cellular channel.

Such techniques are described in particular in W. C. Jakes *Microwave Mobile Communications*, Wiley, N.Y. 1974, as well as in the technical literature, such as "Evaluation of Diversity Schemes in TDMA Digital Mobile Radio", Global Comm. 1990 by Avella et al, as well as "MMSE Diversity Combining for Wideband Digital Cellular Radio", Global Comm. 1990, Greenstein et al.

The foregoing references describe the benefits of diversity signal combination, wherein a transmitted symbol value constituting the digital data is estimated based on the signals from two channels. In the typical prior art scenario, the two channels provide MLSE equalizers using the Viterbi processing technique for establishing the individual values of symbols I(k) received in each channel. A combiner weights each of the symbol signals recovered by each channel in accordance with an estimated noise detected by a channel estimator of each channel. Thus, the combiner can decide on the more reliable value of the decoded symbol, based on the respective noise measurements made for each channel producing the symbol. The combiner can therefore produce a single value of a decoded symbol based on such considerations.

SUMMARY OF THE INVENTION

It is an object of the present invention to implement an optimum diversity combiner with MLSE equalizer.

It is a more specific object of this invention to provide for diversity combination of two-channel symbol data before any hard decision is made regarding the symbol value.

It is yet another object of this invention to provide an MLSE equalizer which needs only minimal trellis manipulation and a corresponding minimal computation overhead.

These and other objects of the invention are provided in a digital cellular communications system. The receiving station of a base station is operated in a diversity mode such that two signals are simultaneously received and processed over the digital cellular channel. Each of the processed signals produces a demodulated signal Z1(k) and Z2(k) which contains the symbol value as masked by the fading effects of the Rayleigh channel.

A Viterbi equalizer is provided which will process both Z1(k) and Z2(k) received from each of the channels containing the demodulated data. The equalizer receives from first and second estimators for each of the respective channels values of f1(n, k) and f2(n, k) representing the frequency amplitude and phase of the receive channels. Estimates of the Gaussian noise are also provided to the equalizer prior to the branch metric calculation of the Viterbi algorithm.

In accordance with a preferred embodiment, the branch metric for the equalizer is calculated using Z1(k), Z2(k) and the respective estimates provided for each of the channels. The invention provides a single trellis manipulation for each of the channel data during the Viterbi estimation process. Further, the combination of signals is provided before any hard decisions as to the value of the symbol being decoded is made.

DESCRIPTION OF THE FIGURE

The FIGURE illustrates a cellular communication system employing an MLSE embedded equalizer for combining and decoding diversity signals.

DESCRIPTION OF THE PREFERRED EMBODIMENT

In the FIGURE there is shown a receiver 9 in a cellular communication system. A transmitter 8 is shown which will modulate symbols I(k) constituting digital data via carrier modulator 10. The carrier modulator 10 is applied to the amplifier 11 and broadcast stages which includes antenna 12.

The receiver 9 is a diversity receiving system, having antennas 14 and 22 associated therewith. The channel formed between antennas 12, 14 and 22 is subject to Rayleigh fading, and as is known to skilled receiver designers, the diversity operation improves the bit error rate for received and decoded digital data by upwards of 7 dB over a single antenna, single channel receiving system at 1% bit error rate.

The base station receiving system 9 includes two channels for processing signals received over first and second paths between the antenna pair 14, 22 and transmit antenna 12. Down converters 16 and 24 produce an intermediate frequency signal.

The intermediate frequency signal is filtered in IF filters 17 and 25. First and second analog and digital converters 18 and 26 produce digitized versions of the intermediate frequency signal.

$Z_1(k)$ and $Z_2(k)$ are a replica of the modulated signal S(t) transmitted via the cellular channel. Each of these signals $Z_1(k)$ and $Z_2(k)$ can be represented as the summation of the following terms:

$$Z_1(k) = \sum_{n=0}^{1} f_1(n,k)I(k-n) + n_1(k), \quad (1)$$

$$Z_2(k) = \sum_{n=0}^{1} f_2(n,k)I(k-n) + n_2(k), \quad (2)$$

$n_1(k)$ and $n_2(k)$ come from Gaussian noise, interference and non-compensated intersymbol interference.

Each of the functions for the first channel $f_1(n, k)I(k-n)$ and the corresponding function of equation 2 for the second channel represent the multipath effects on signal amplitude and phase that occur over the cellular channel. The functions $f_1(n, k)$ and $f_2(n, k)$ for values of n of 0 and 1, are estimations of the amplitude and phase changes occurring over the multipath channel between the antenna pair 14 and 22, and the transmission antenna 12. For n=0, the $f_1(n, k)$ function represents the estimated channel status for the received data symbol and for n=1 $f_1(n, k)$ represents the estimated channel status for an interfering replica of the symbol which arrives via a second path over the channel.

These functions can be decoded using the MLSE type equalizer, executing the Viterbi algorithm. As is known to those skilled in the art, essential to executing the Viterbi algorithm is the calculation of the branch metric of the trellis, identifying the possible states of the decoded data.

With the embedded diversity combiner equalizer 28, the branch metric is calculated for both quantities $Z_1(k)$, $Z_2(k)$ in a single computational step. This branch metric can be represented as follows:

$$br\_met[Z_1(k), Z_2(k), I(k)] = \qquad (3)$$

$$(\sigma_2(k))^2 \left| Z_1(k) - \sum_{n=0}^{1} f_1(n,k)I(k - n) \right|^2 +$$

$$(\sigma_1(k))^2 \left| Z_2(k) - \sum_{n=0}^{1} f_2(n,k)I(k - n) \right|^2$$

The noise functions $n_1(k)$, $n_2(k)$ are represented by the standard deviations from these noise functions as $\sigma_1(k)$ and $\sigma_2(k)$.

The channel estimators 19 and 27 can be of the conventional type for estimating the functions f(n,k), as well as provide an indication $\sigma_1(k)$ or $\sigma_2(k)$ of the noise of the channel. This noise in the foregoing equation is a weighting function for weighting the respective signals of the branch metric calculation.

This estimation of the standard deviation of the noise function can be obtained from the following function, wherein k+1 is the symbol time following the symbol time k. This function can be estimated as:

$$\sigma_1^2(k + 1) = \qquad (4)$$

$$\sigma_1^2(k) + K_2 \left[ \left| Z_1(k) - \sum_{n=0}^{1} f_1(n,k)I(k - n) \right|^2 - \sigma_1^2(k) \right]$$

A similar function exists for $\sigma_2$ as will be recognized by those skilled in the art. As these quantities are all known from the channel estimators 19 and 27 of the prior art, the noise function can therefore be conveniently represented.

The remaining Viterbi algorithm processing steps for finding the likely symbol value continue as in the prior art Viterbi processing techniques. The value of the symbol I(k) can be found with a bit error rate of as much as 1 dB improved over the prior art diversity combiners of the type wherein values for the symbols I(k) were computed for both channels, and then combined with an appropriate estimation of the noise function. The channel performance estimates $f_1(n, k)$ and $f_2(n, k)$ have greater reliability as they are made from a value of I(k) derived from both signals $Z_1(k)$ and $Z_2(k)$. Further, the computational overhead of a single Viterbi algorithm execution versus two for each channel of the prior art, improves the computational efficiency and therefore the bus structure for a cellular base station. The channel estimators 19, 27 and equalizer 28 may be implemented in a digital signal processor such as the Motorola DSP 96000. The device is programmable with an assembler code to carry out the estimation of $f_1(n, k)$ and $f_2(n, k)$, as well as to perform the Viterbi algorithm functions including all requisite branch metric br_met calculations for the symbol I(k) values.

Thus, there has been described with respect to one embodiment an MLSE equalizer having an embedded diversity combiner, as described more particularly by the claims which follow.

What is claimed is:

1. An apparatus for combining signals $Z_1(k)$ and $Z_2(k)$ received on different antennas over a multipath fading channel comprising:

first and second channel estimators, each receiving said signals $Z_1(k)$ and $Z_2(k)$ and providing estimates of each channel associated with said signals $Z_1(k)$, $Z_2(k)$ as $f_1(n, k)$ and $f_2(n, k)$; and an MLSE equalizer for receiving each of said signals $Z_1(k)$ and $Z_2(k)$, and said channel estimates $f_1(n, k)$, and forming a single estimate of symbol values contained in said signals $Z_1(k)$ and $Z_2(k)$ wherein said MLSE equalizer in forming said single estimate executes a Viterbi algorithm which computes a branch metric for each symbol I(k) contained in said signals $Z_1(k)$ and $Z_2(k)$, as $$br\_met[Z_1(k), Z_2(k), I(k)] =$$

$$(\sigma_2(k))^2 \left| Z_1(k) - \sum_{n=0}^{1} f_1(n,k)I(k - n) \right|^2 +$$

$$(\sigma_1(k))^2 \left| Z_2(k) - \sum_{n=0}^{1} f_2(n,k)I(k - n) \right|^2$$

where $\sigma_1(k)$ and $\sigma_2(k)$ are standard deviations of $n_1(k)$, $n_2(k)$ representing the noise in each channel at the time of each symbol time (k).

2. The apparatus of claim 1 wherein said first and second channels estimators provide estimates of said standard deviations $\sigma_1(k)$ and $\sigma_2(k)$.

3. The apparatus of claim 1 wherein said MLSE equalizer in forming said single estimate executes a Viterbi algorithm.

4. The apparatus of claim 3 wherein said Viterbi algorithm includes computing a branch metric for each symbol I(k) contained in said signals $Z_1(k)$ and $Z_2(k)$ in which standard deviations representing the noise in each channel are used as weighting functions.

5. A method for processing modulated symbol data I(k) transmitted via a carrier signal over a communications channel subject to multipath fading, comprising:

receiving said symbol data over first and second antennas within said communications channel;

demodulating said symbol data received from each antenna to form first and second streams of symbol data, $Z_1(k)$ and $Z_2(k)$;

estimating from said first and second streams of symbol data an amplitude and phase error function $f_1(n, k)$ and $f_2(n, k)$ for each of said first and second streams of symbol data;

estimating said symbol data I(k) with MLSE equalizer using said streams of symbol data $Z_1(k)$ and $Z_2(k)$ and said error functions $f_1(n, k)$ and $f_2(n, k)$;

wherein each of said streams of symbol data $Z_1(k)$ and $Z_2(k)$ can be expressed as:

$$Z_1(k) = \sum_{n=0}^{1} f_1(n,k)I(k-n) + n_1(k)$$

$$Z_2(k) = \sum_{n=0}^{1} f_2(n,k)I(k-n) + n_2(k)$$

wherein $n_1(k)$ and $n_2(k)$ represent the estimated uncorrelated noise in each received signal.

6. The method for processing modulated symbol data according to claim 5 wherein said branch metric for said Viterbi algorithm is calculated as $$br\_met[Z_1(k), Z_2(k), I(k)] =$$

$$(\sigma_2(k))^2 \left| Z_1(k) - \sum_{n=0}^{1} f_1(n,k)I(k-n) \right|^2 +$$

$$(\sigma_1(k))^2 \left| Z_2(k) - \sum_{n=0}^{1} f_2(n,k)I(k-n) \right|^2$$

where $\sigma_1(k)$ and $\sigma_2(k)$ are standard deviations of $n_1(k)$, $n_2(k)$.

7. The method according to claim 6 wherein said standard deviation of $n_1(k)$ and $n_2(k)$ are estimated as $$\sigma_1^2(k+1) =$$

$$\sigma_1^2(k) + K_2 \left[ \left| Z_1(k) - \sum_{n=0}^{1} f_1(n,k)I(k-n) \right|^2 - \sigma_1^2(k) \right]$$

$$\sigma_2^2(k+1) =$$

$$\sigma_2^2(k) + K_2 \left[ \left| Z_2(k) - \sum_{n=0}^{1} f_2(n,k)I(k-n) \right|^2 - \sigma_1^2(k) \right].$$

8. The method for processing modulated symbol data according to claim 5, wherein said step of estimating said symbol data I(k) comprises using a Viterbi algorithm.

9. The method for processing modulated symbol data according to claim 5, wherein said Viterbi algorithm comprises processing a branch metric from said streams of symbol data $Z_1(k)$ and $Z_2(k)$ and said error functions $f_1(n, k)$ and $f_2(n, k)$.

* * * * *